United States Patent [19]
Chikama

[11] Patent Number: 5,701,195
[45] Date of Patent: Dec. 23, 1997

[54] LIGHT SIGNAL RECEPTION APPARATUS HAVING AN IMPROVED LIGHT SURGE ELIMINATING FUNCTION

[75] Inventor: Terumi Chikama, Kawasaki, Japan

[73] Assignee: Fujitsu Limited, Kanagawa, Japan

[21] Appl. No.: 658,944

[22] Filed: May 31, 1996

[30] Foreign Application Priority Data

Jun. 5, 1995 [JP] Japan ................................. 7-137597

[51] Int. Cl.⁶ ....................................................... H01S 3/00
[52] U.S. Cl. ............................ 359/341; 359/161; 359/177
[58] Field of Search ................................. 359/161, 177, 359/337, 341

[56] References Cited

U.S. PATENT DOCUMENTS

| | | | |
|---|---|---|---|
| 5,317,660 | 5/1994 | Vieth | 385/24 |
| 5,436,760 | 7/1995 | Nakabayashi | 359/341 |
| 5,504,608 | 4/1996 | Neeves et al. | 359/124 |
| 5,552,919 | 9/1996 | Majima et al. | 359/161 |

*Primary Examiner*—Mark Hellner
*Attorney, Agent, or Firm*—Helfgott & Karas, P.C.

[57] ABSTRACT

In a light signal reception apparatus having a light surge eliminating function and provided in an optical transmission system, the apparatus of the present invention can effectively eliminate a light surge accidentally included in a light signal. The apparatus includes: an optical amplifying unit for receiving a light signal and amplifying it to a predetermined level; an optical filtering unit operatively connected to the optical amplifying unit for eliminating the light surge and passing through the light signal; an opto-electrical converting unit operatively connected to the optical filtering unit for converting the light signal to an electrical signal; and a monitoring unit operatively connected to the optical amplifying unit for monitoring a fluctuation of the light signal, and controlling a transmission wavelength characteristic of the optical filtering unit or a wavelength of the light signal in order to eliminate the light surge.

10 Claims, 11 Drawing Sheets

LIGHT SIGNAL RECEPTION APPARATUS HAVING AN IMPROVED LIGHT SURGE ELIMINATING FUNCTION

BACKGROUND OF THE INVENTION

1. Field of the Invention

The present invention relates to a light signal reception apparatus having an improved light surge eliminating function, and this apparatus can be preferably provided in an optical transmission system using optical amplifiers. According to the present invention, it is possible to effectively eliminate accidentally including a light surge in the light signal.

2. Description of the Related Art

In general, in a long distance optical transmission system, a plurality of optical repeaters, each of which includes an optical amplifier, are provided for each predetermined distance (or predetermined position) on an optical fiber cable. The optical amplifier is usually formed by an optical fiber amplifier doped by a rare-earth element, such as an erbium (Er), and amplifies a signal to be transmitted in the form of a light signal. In an actual use of the optical amplifier, it has been known that the light surge can be accidentally induced at the moment when the light signal is cut off and recovers after a short time.

When the light surge is transmitted to the following circuits, various failures may occur in the circuits. Accordingly, it is desired to eliminate the light surge in order to avoid failures.

SUMMARY OF THE INVENTION

The object of the present invention is to provide a light signal reception apparatus which can effectively eliminate a light surge accidentally included in a light signal.

In accordance with the present invention, there is provided a light signal reception apparatus having a light surge eliminating function and provided in an optical transmission system using optical amplifiers.

The apparatus of the present invention includes: an optical amplifying unit for receiving a light signal and amplifying it to a predetermined level; an optical filtering unit operatively connected to the optical amplifying unit for eliminating the light surge and passing through the light signal; an opto-electrical converting unit operatively connected to the optical filtering unit for converting the light signal to an electrical signal; and a monitoring unit operatively connected to the optical amplifying unit for monitoring fluctuations in the light signal, and controlling a transmission wavelength characteristic of the optical filtering unit or a wavelength of the light signal in order to eliminate the light surge.

In a preferred embodiment, the optical filtering unit comprises a tunable optical filter of which the transmission wavelength is controlled in accordance with fluctuations in the wavelength of the light signal: and the monitoring unit controls the tunable optical filter in such a way that the transmission wavelength of the tunable optical filter is shifted so as to be out of a band of the wavelength of the light signal at the moment when the monitoring unit detects cut-off of the light signal, and after a predetermined protection time from cut-off of the light signal, the transmission wavelength of the tunable optical filter is returned so as to control in accordance with a fluctuation in the wavelength of the light signal.

In another preferred embodiment, the optical filtering unit comprises a tunable optical filter of which the transmission wavelength is controlled in accordance with fluctuations in the wavelength of the light signal; and the monitoring unit controls the tunable optical filter in such a way that the transmission wavelength of the tunable optical filter is shifted so as to be out of a band of the wavelength of the light signal at the moment when the monitoring unit detects a fluctuation of the light signal which is faster than the response speed of the optical amplifying unit.

In still another preferred embodiment, the optical filtering unit comprises a tunable optical filter of which the transmission wavelength characteristic is controlled by monitoring an output level of the optical filtering unit in such a way that the output level does not exceed a predetermined level.

In still another preferred embodiment, a light signal reception apparatus further comprises a wavelength conversion element which is provided between the optical amplifying unit and the optical filtering unit, and the wavelength conversion element has a self-phase modulation function which changes the wavelength of the light signal so as to be out of the transmission wavelength of the optical filtering unit when a surge waveform of the light signal is detected.

In still another preferred embodiment, a light signal reception apparatus further comprises a wavelength conversion unit which is provided between the optical amplifying unit and the optical filtering unit, and the wavelength conversion unit changing the wavelength of the light signal so as to be out of the transmission wavelength of the optical filtering unit at the moment when the monitor unit detects a surge waveform of the light signal.

In still another preferred embodiment, the wavelength conversion element or unit comprises a delay unit for delaying the light surge.

In still another preferred embodiment, the wavelength conversion element comprises a chalcogenide glass.

In still another preferred embodiment, the wavelength conversion unit comprises a bistable laser element, a wavelength conversion laser element, or a four-wave mixing element.

DESCRIPTION OF THE PREFERRED EMBODIMENTS

Before describing preferred embodiments of the present invention, conventional arts and problems will be explained in detail below.

Figure 1:
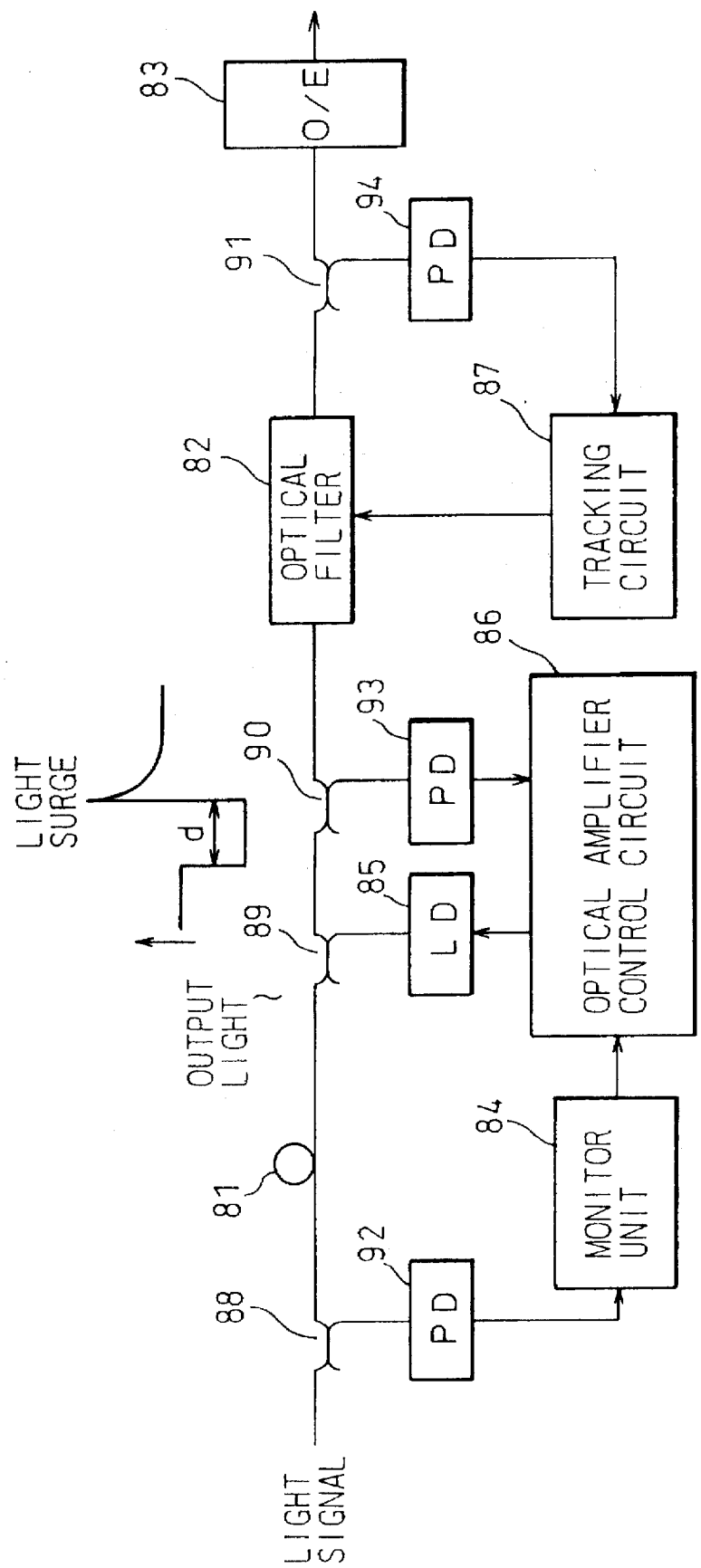
FIG. 1 is an explanatory view of one example of a conventional light signal reception apparatus.

FIG. 1 is an explanatory view of one example of the conventional light signal reception apparatus. In FIG. 1, reference number 81 denotes an optical fiber amplifier doped by a rare-earth element, such as erbium (Er); 82 an optical filter; 83 a light reception unit (i.e., an opto-electrical converter: O/E) for converting a light signal to an electrical signal; 84 a monitor unit; 85 a semiconductor laser (LD) used as a pumping light source; 86 an optical amplifier control circuit; 87 a tracking circuit; 88, 90 and 91 optical branching units; 89 an optical wavelength multiplexer; and 92 to 94 photoelectric converters (PD) each having a photo diode.

When the optical fiber amplifier 81 is formed by, for example, the optical fiber doped by erbium (Er), the semiconductor laser 85 generates a pumping light having a wavelength, for example, 1480 nm (nano meter). The pumping light is applied to the optical fiber amplifier 81 through the optical wavelength multiplexer 89 and used to amplify the light signal having the wavelength from 1530 to 1565 nm. Accordingly, the gain of the optical fiber amplifier 81 can be controlled in accordance with a power of the pumping light. In this case, it may be possible to use a pumping light having the wavelength 980 nm or 810 nm.

The light signal amplified by the optical fiber amplifier 81 (below, an amplified light signal) is transmitted to the photoelectric converter 93 through the light branching unit 90, and converted to the electrical signal. Further, the electrical signal is transmitted to the optical amplifier control circuit 86. The optical amplifier control circuit 86 controls the power of the pumping light, which is applied to the optical fiber amplifier 81 from the semiconductor laser 85, as the level of the amplified light signal is set to a predetermined setting level.

Further, the amplified light signal is transmitted to the light reception unit (O/E) 83 through the optical filter 82, and converted to the electrical signal therein. The electrical signal is processed in the following circuits (not shown).

In this case, the optical filter 82 controls a band of transmission wavelength of the light signal based on the control of the tracking circuit 87 as the level of the light signal being maximum. The light signal transmitted through the optical filter 82 is detected by the photoelectric converter 94 through the optical branching unit 91. Accordingly, it is possible to eliminate a light noise component in the long distance optical transmission system, and to extract only the desired light signal component even if there are fluctuation in the wavelength of an emitted light in a transmission side, and fluctuation of wavelength in the repeater and the optical fiber.

On the other hand, in the long distance optical transmission system, the light signal is cut off, for example, when an optical connector is inserted/removed, when an attenuation characteristic of an optical attenuator is suddenly changed, when an electrical signal is accidentally cut off, and when the optical fiber is extremely bent.

When the light signal is cut off as mentioned above, the level of the light signal is set to approximately zero, and the optical amplifier control circuit 86 controls the power of the pumping light so as to increase it.

After a short moment, when the light signal is recovered and sent to the optical fiber amplifier 81 again, a light surge having a large power compared to a normal state is induced in the optical fiber amplifier 81 (see FIG. 1). This is because pumping energy has already accumulated in the optical fiber amplifier 81.

In this case, when a cut-off time of the light signal is very short, for example, under 10 µs, the light surge is not induced from the optical fiber amplifier 81 caused by delay of response of the light signal. However, as shown in an upper portion in FIG. 1, it is assumed that, when the light signal is stably output from the optical fiber amplifier 81, it is suddenly cut off and recovered after the time interval "d" (for example, "d" is over 10 µs) from the cut-off time. In this case, after the time "d", a very large light surge is induced during a time interval of a milli-second or more.

When such large light surge is transmitted to the light reception unit 83, it damages the photo diodes in the light reception unit 83 and peripheral circuits (not shown).

Further, in an optical connector, when there are oil layers or dust between both contacting surfaces of two optical fibers, these oil layers and dust absorb the light surge having a large power so that a temperature of the contacting surface considerably increases. As a result of the increased temperature, the contacting surface is carbonized so that the transmission loss in the optical fiber is considerably increased.

Still further, when the optical fiber is damaged in previous stages of the light reception unit 83, a light surge having very large power is emitted to the environment so that undesirable influences may be applied to a human body.

In order to solve the above problems, in a conventional light signal reception apparatus, the monitor unit 84 is provided between the photoelectric converter (PD) 92 and the optical amplifier control circuit 86. The photoelectric converter 92 detects the light signal through the light branching unit 88. When the monitor unit 84 detects cut-off of the light signal in accordance with an output of the photoelectric converter 92, the monitor unit 84 controls the optical amplifier control circuit 86 so as to stop the pumping operation of the semiconductor laser 85 and the amplifying operation of the optical fiber amplifier 81.

When the light signal is sent again to the optical fiber and the monitor unit 84 detects the recovery of the light signal, the monitor unit 84 controls the operation of the optical amplifier control circuit 86 so as to start the pumping operation of the semiconductor laser 85 and the amplifying operation of the optical fiber amplifier 81. As a result, it is possible to eliminate the light surge.

Figure 2:
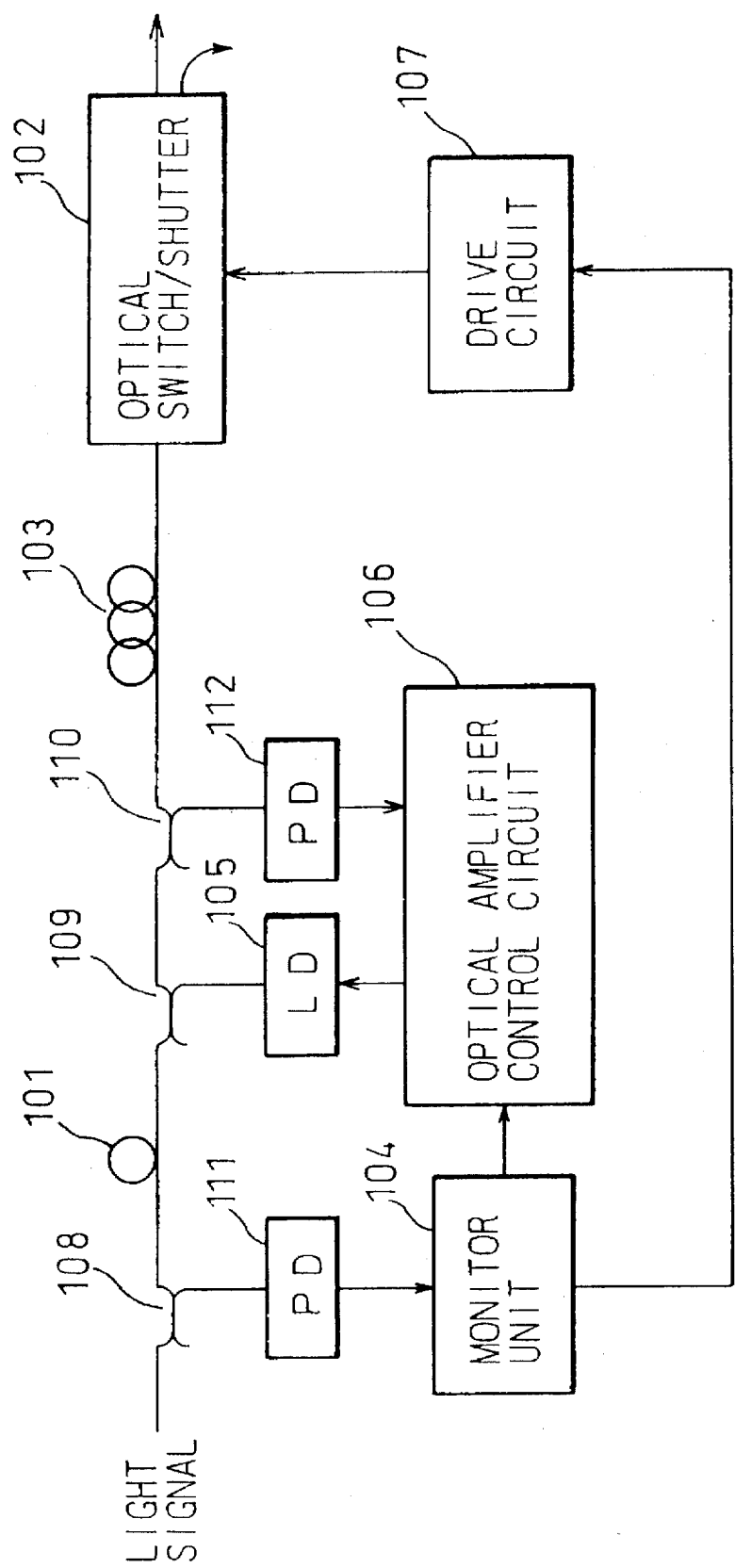
FIG. 2 is an explanatory view of one example of an essential part of the conventional light signal reception apparatus shown in FIG. 1.

FIG. 2 is an explanatory view of one example of the essential part of the conventional light signal reception apparatus shown in FIG. 1. In FIG. 2, reference number 101 denotes an optical fiber amplifier; 102 an optical switch or an optical shutter; 103 a delay optical fiber; 104 a monitor unit; 105 a semiconductor laser (LD); 106 an optical amplifier control circuit; 107 a drive circuit; 108 and 110 light branching units; 109 an optical wavelength multiplexer; 111 and 112 photoelectric converters (PD).

The power of the pumping light generated by the semiconductor laser 105 is controlled by the optical amplifier control circuit 106 so that the gain of the optical fiber amplifier 101 is also controlled. This structure is the same as that of FIG. 1.

In the conventional art shown in FIG. 2, the light signal is converted to an electrical signal by the photoelectric converter 111 through the light branching unit 108. When the monitor unit 104 detects the light surge by checking the output of the photoelectric converter 111, the monitor unit 104 drives the drive circuit 107 and cuts off or by-passes the light surge so as not to transmit it to the following circuits through the optical switch or the optical shutter 102.

Figure 3:
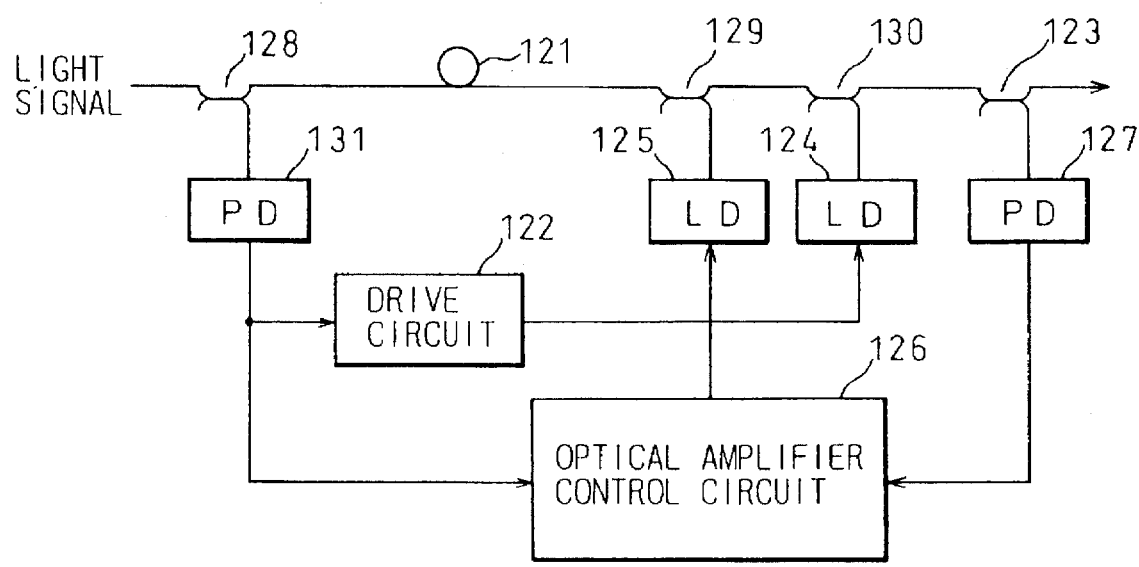
FIG. 3 is an explanatory view of another example of an essential part of the conventional light signal reception apparatus shown in FIG. 1.

FIG. 3 is an explanatory view of another example of an essential part of the conventional light signal reception apparatus shown in FIG. 1. In FIG. 3, reference number 121 denotes an optical fiber amplifier; 122 a drive circuit; 123 and 128 optical branching units; 124 and 125 semiconductor lasers (LD); 126 an optical amplifier control circuit; 127 and 131 photoelectric converters (PD); and 129 and 130 optical wavelength multiplexers.

In FIG. 3, as explained above, the pumping operation of the semiconductor laser 125 is controlled by the optical amplifier control circuit 126, and the light signal is transmitted to the optical fiber amplifier 121 and the photoelectric converter 131 through the optical branching unit 128. The pumping light generated by the semiconductor laser 125, which is controlled by the optical amplifier control circuit 126 in response to the amplified light signal, is transmitted to the optical fiber amplifier 121 through the optical wavelength multiplexer 129.

On the other hand, the complemental signal light generated by the semiconductor laser 124, which is controlled by the drive circuit 122 in response to light signal itself, is transmitted to the optical fiber amplifier 121 through the optical wavelength multiplexer 130. As a result, the gain of the optical fiber amplifier 121 is controlled in response to the complemental signal light and the pumping light generated by the semiconductor lasers 124 and 125 so that it is possible to maintain the amplified light signal to the setting level.

Figure 4:
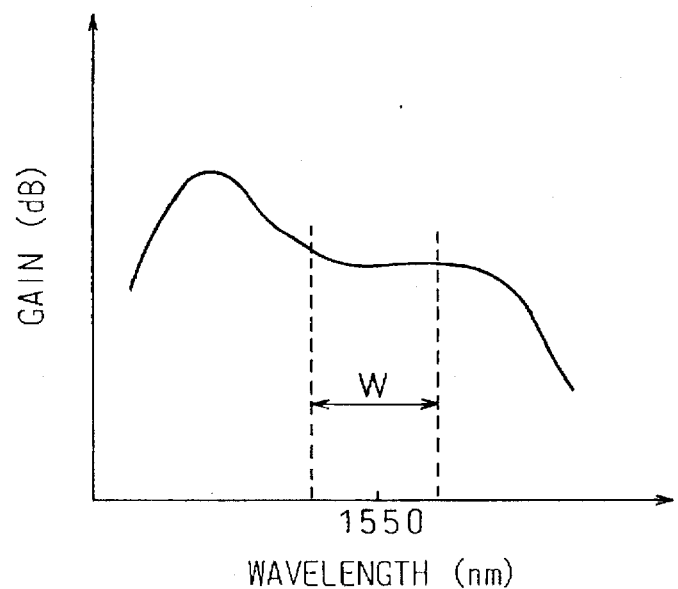
FIG. 4 is an explanatory view of a typical gain characteristic of an optical fiber amplifier.

FIG. 4 is an explanatory view of the gain characteristic of the typical optical fiber amplifier. The ordinate denotes the gain and the abscissa denotes the wavelength. This gain characteristic corresponds to a spectrum distribution of an amplified spontaneous emission (ASE) (one kind of light noise) in the optical fiber amplifier doped by erbium (Er). For example, when a center wavelength is 1550 nm, a filter having the band width W of the transmission wavelength defined by the center wavelength 1550 nm is used as the optical filter. In this case, it is possible to eliminate influence of the light noise, i.e., the amplified spontaneous emission, when the band width W becomes narrower. However, in this case, an allowable range for the fluctuation of a light emission wavelength from the transmission side becomes narrower so that it is necessary to provide a high cost apparatus in order to control the light emission wavelength with high precision.

In order to solve above problem, as shown in FIG. 1, a tunable optical filter 82 of which wavelength can be controlled by the tracking circuit 87, is provided between the optical branching units 90 and 91.

However, there are important problems in the above conventional arts inspite of various proposed solutions as explained below.

In the conventional art shown in FIG. 1, the amplifying operation at the optical fiber amplifier 81 is stopped at the moment when the optical signal is cut off, and the amplifying operation is started again at the moment when the light signal is input. In this case, since a rise time of the amplifying operation is not short (i.e., the rise time of the light signal is slow), a lot of signals are dropped out during this long rise time.

Further, when the light surge is induced in a repeater amplifier (not shown) provided in the previous stage, the monitor unit 84 does not detect the cut-off of light signal so that the amplifying operation of the optical fiber amplifier 81 is continued. That is, when the light surge is input, it may be amplified caused by delay of response of the optical amplifier control circuit 86 so that the amplified light surge is transmitted to the light reception unit 83 through the optical filter 82.

In the conventional art shown in FIG. 2, the monitor unit 104 detects the light surge from the previous stage and controls the optical switch or the optical shutter 102 so as not to transmit the light surge to the following stage. However, there is a problem in that the high speed optical switch or optical shutter 102 and its drive circuit 107 must be provided in the circuit.

In the conventional art shown in FIG. 3, when the light surge is input, the power of the pumping light generated by the semiconductor laser 124 is reduced so that the gain of the optical fiber amplifier 121 can be decreased. However, it is necessary to provide two semiconductor lasers 124 and 125 so that a cost of the apparatus is considerably increased. Further, it is necessary to provide complicated peripheral circuits (not shown) in order to control the gain of the optical fiber amplifier 121.

Accordingly, the present invention aims to provide a light signal reception apparatus having a simplified structure in order to eliminate the light surge as explained in detail below.

Figure 5:
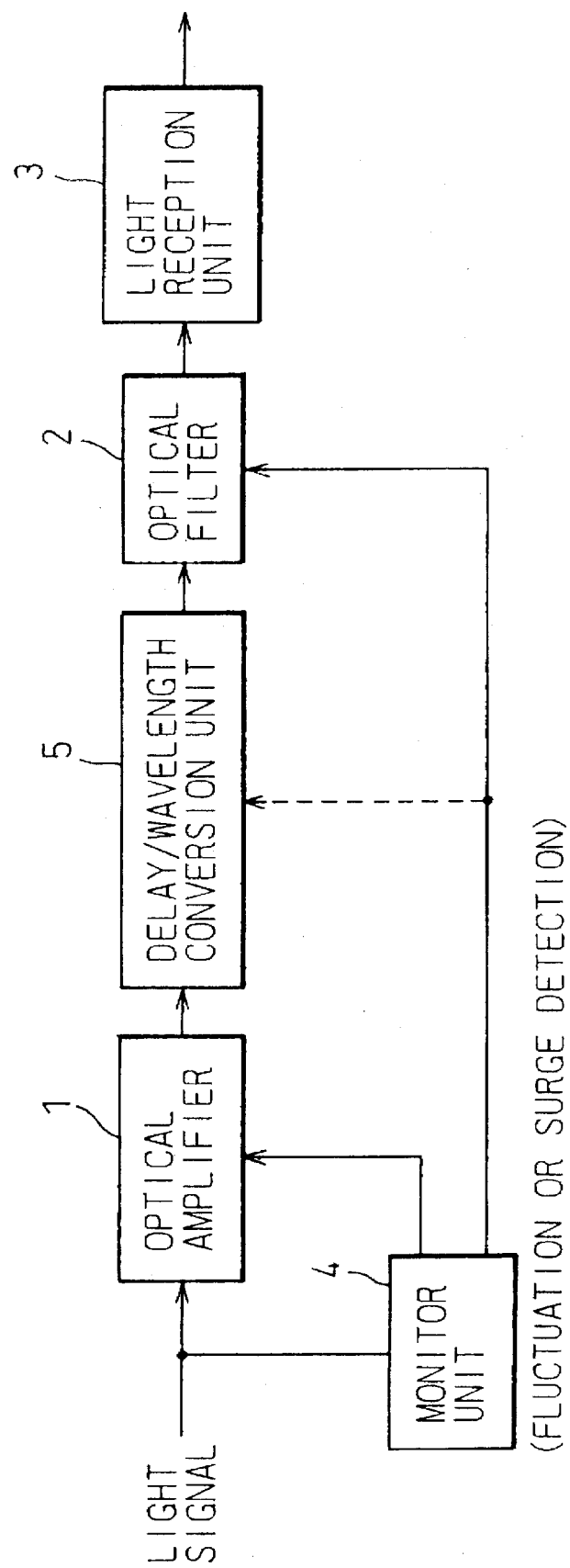
FIG. 5 is a basic structure of a light signal reception apparatus according to the present invention.

FIG. 5 is a basic structure of a light signal reception apparatus according to the present invention.

The structural features of the present invention are as follows.

(1) The monitor unit 4 detects cut-off or fluctuation of the light signal, such as light surge, and controls the transmission wavelength characteristics of the optical filter 2 or the wavelength of the light signal in order to eliminate the light surge. In the drawing, reference number 1 denotes an optical amplifier, 3 a light reception unit, and 5 a delay/wavelength conversion unit.

In this case, the optical amplifier 1 is formed by the optical fiber amplifier doped by the rare-earth element, and the monitor unit 4 monitors the light signal which is input to the optical fiber amplifier. When the monitor unit 4 detects the cut-off or the light surge of the light signal, the monitor unit 4 controls the optical filter 2 in such a way that the transmission wavelength of the optical filter 2 is different from the wavelength of the light signal so that the light surge is not passed through the optical filter 2.

(2) The optical filter 2 is formed by the tunable optical filter which can control the transmission wavelength in accordance with the fluctuation of the wavelength of the light signal. The monitor unit 4 shifts the transmission wavelength of the tunable optical filter 2 so as to be out of a band of the wavelength of the light signal when detecting the cut-off of the light signal. Further, after a predetermined protection time, the monitor unit 4 controls the transmission wavelength of the tunable optical filter 2 so as to follow the fluctuation of the wavelength of the light signal.

The tunable optical filter 2 controls the transmission wavelength characteristic as the transmitted output of the light signal being maximum in a normal state. As a result, it is possible to pass through only the light signal in accordance with the fluctuation of the light emission wavelength of the light signal emitted by the transmission side. As mentioned above, when the monitor unit 4 detects the cut-off of the light signal, it controls the tunable optical filter so as to shift the transmission wavelength out of the band of the wavelength of the light signal. When the light signal is input again, the monitor unit 4 starts a tracking control of the tunable optical filter 2 after the predetermined protection time (i.e., a time when the optical amplifier 1 returns to the normal state). Accordingly, if the light surge is induced in the optical amplifier 1 caused by the cut-off the light signal, it is possible to eliminate the light surge in the optical filter 2.

(3) Further, in the case of the above item (2), the monitor unit 4 shifts the transmission wavelength of the tunable optical filter 2 so as to be out of the band of the wavelength of the light signal when detecting the fluctuation component which has a response speed faster than that of the optical amplifier 1.

That is, when the monitor unit 4 detects the fluctuation component of the light signal, for example, the light surge, which has a response speed faster than that of the optical amplifier 1, it shifts the transmission wavelength of the tunable optical filter 2 so as to be out of the band of the wavelength of the light signal. As a result, when the light surge is input to the optical amplifier 1, it is possible to cut off the light surge in the optical filter 2 even if the light surge is amplified by the optical amplifier 1.

(4) The tunable optical filter 2 can control the transmission wavelength itself by monitoring an output level of the light signal, and can control the transmission wavelength characteristic in such a way that the output level of the optical filter 2 does not exceed a predetermined level.

That is, the monitor unit 4 monitors the output of the optical filter 2, and controls the transmission wavelength characteristic of the optical filter 2 when the output level of the optical signal exceeds the predetermined level. That is, the monitor unit 4 controls the transmission wavelength characteristic of the tunable optical filter, and can eliminate the light surge in such a way that the band of the wavelength, at which the transmission loss becomes large, is set to the wavelength of the light signal.

(5) The wavelength conversion element (5) may be provided between the optical amplifier 1 and the optical filter 2. The wavelength conversion element (5) has a self-phase modulation (SPM) function which can change the wavelength of the light signal so as to be out of the band of the transmission wavelength of the optical filter 2 in accordance with a waveform of the light surge.

That is, the wavelength conversion element, for example, an oxide fiber, changes the wavelength of the light signal based on the self-phase modulation function when the power of the light signal is large. When the light surge is output from the optical amplifier 1, the wavelength of the light surge is converted by the wavelength conversion element. When the wavelength of the light surge is shifted out of the band of the transmission wavelength of the optical filter 2, it is deemed that the light surge is cut off.

(6) The wavelength conversion unit (5) may be provided between the optical amplifier 1 and the optical filter 2. The wavelength conversion unit (5) outputs the converted wavelength after the monitor unit 4 converts the wavelength of the light signal so as to be out of the band of the transmission wavelength.

For example, the wavelength conversion unit is formed by a bistable laser, a wavelength conversion laser, etc.. When the monitor unit 4 detects the light surge, it controls the wavelength conversion unit so as to convert the wavelength of the light signal. Accordingly, it is possible to cut off the light surge since the light surge becomes out of the band of the transmission wavelength of the optical filter 2.

Figure 6:
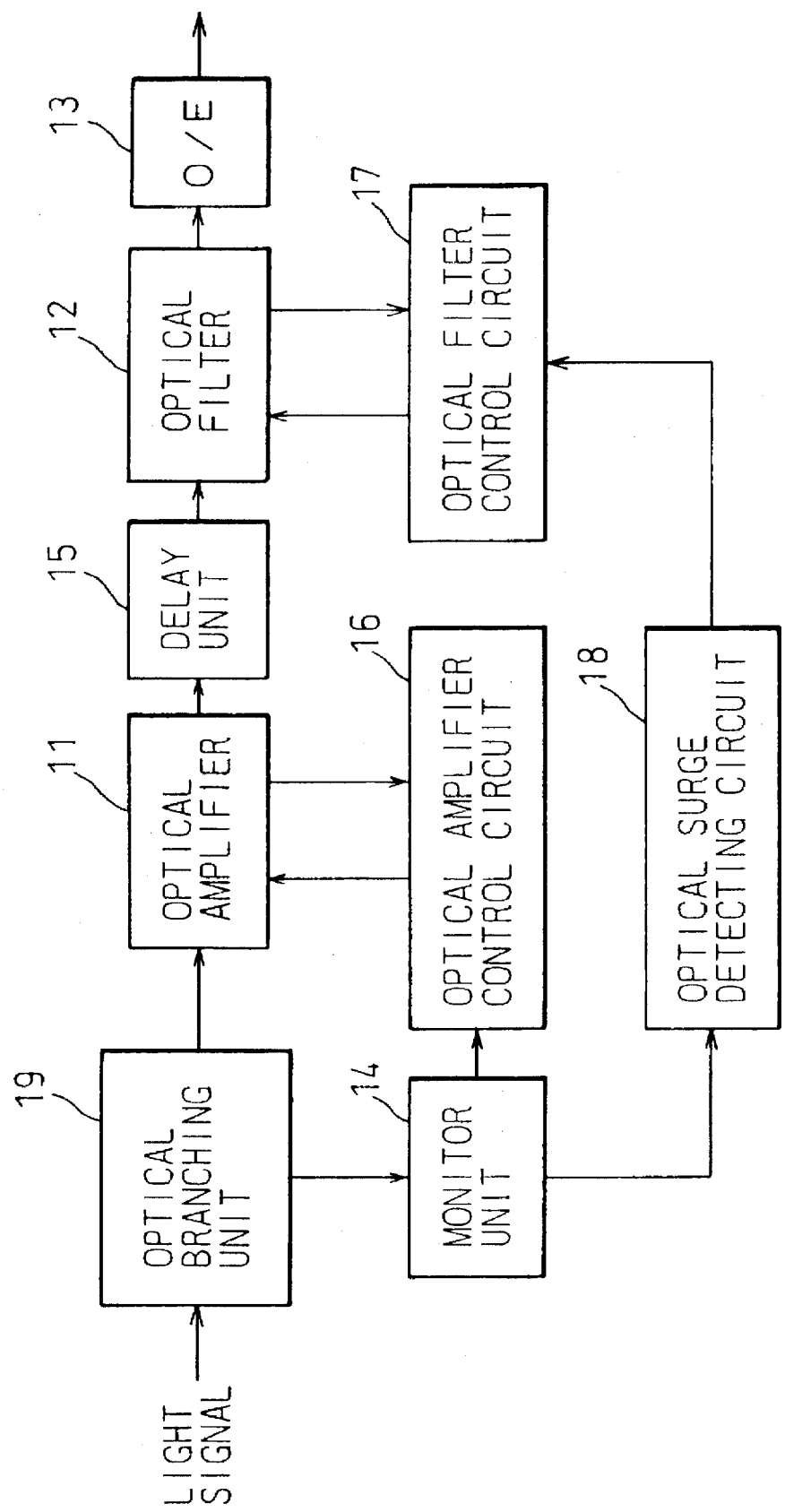
FIG. 6 is a block diagram of a light signal reception apparatus according to a first embodiment of the present invention.

FIG. 6 is a block diagram of a light signal reception apparatus according to a first embodiment of the present invention. In FIG. 6, reference number 11 denotes an optical amplifier, 12 an optical filter, 13 a light reception unit (opto-electrical converter: O/E), 14 a monitor unit, 15 a delay unit, 16 an optical amplifier control circuit, 17 an optical filter control circuit, 19 a light surge detecting circuit, and 19 an optical branching unit.

In this embodiment, the optical amplifier 11 amplifies the light signal, and transmits the amplified light signal to the optical filter 12 through the delay unit 15. The optical filter 12 eliminates the light noise, and outputs the light signal, from which the light noise is eliminated, to the light reception unit 13. The light reception unit 13 converts the light signal to the electrical signal in order to transmit it to the following circuit. The optical filter 12 controls the transmission wavelength characteristic based on the control of the optical filter control circuit 17 in such a way that the level of the transmission light signal becomes a maximum. The tunable optical filter includes the optical filter control circuit 17.

For example, the tunable optical filter is preferably formed by an acoustoptic filter, an electrooptic filter, a Fabry-Perot filter, an dielectric-multilayer film filter, etc.. In this case, the acoustoptic filter and the electrooptic filter are preferable when the response speed must be set in the range of 1 to 100 µs.

One example of the tunable optical filter is disclosed in the following document, i.e., Charles. A. Vrackett, "Dense Wavelength Division Multiplexing Networks: Principles and Applications" IEEE Journal on Selected Areas in Communications, Vol. 8, No. 6, August 1990, pp. 948 to 964.

The optical amplifier control circuit 16 controls the output level of the optical amplifier 11 as the output level of the light signal being set to a predetermined level. When the monitor unit 14 detects cut-off of the light signal, it stops the amplifying operation of the optical amplifier 11. When the monitor unit 14 detects the light signal again, it starts the amplifying operation of the optical amplifier 11. The optical surge detecting circuit 18 detects the light surge, and the optical filter control circuit 17 controls the optical filter 12 in response to detection of the light surge in order to change the transmission wavelength of the optical filter 12 so as to be out of the band of the wavelength of the light signal.

As another example, the output signal amplified by the optical amplifier 11 can be added to the optical surge detecting circuit 18. In this case, the optical surge detecting circuit 18 detects the light surge and outputs a detected signal to the optical filter control circuit 17. As mentioned above, the optical filter control circuit 17 can control the band of the transmission wavelength of the optical filter 12.

Since the band of the transmission wavelength of the optical filter 12 is controlled, the light surge can be eliminated in the optical filter 12 even if it is amplified by the optical amplifier 11. In this case, the delay circuit 15 delays the light signal amplified by the optical amplifier 11, and outputs the delayed light signal to the optical filter 12 so that the band of the transmission wavelength of the optical filter 12 becomes out of the wavelength of the light signal. The delay circuit 12 can be preferably formed by an optical fiber.

Figure 7:
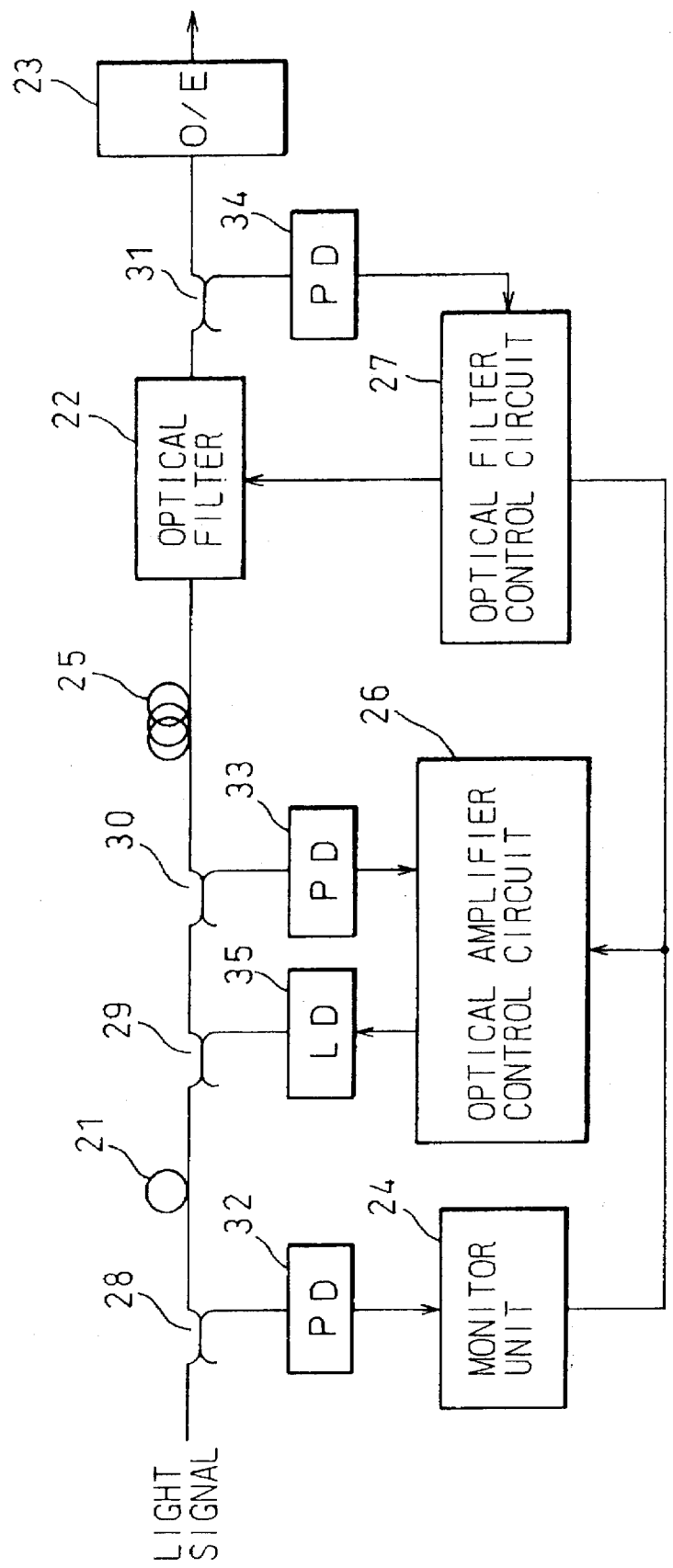
FIG. 7 is an explanatory view of the first embodiment shown in FIG. 6.

FIG. 7 is an explanatory view of the first embodiment of FIG. 6. In FIG. 7, reference number 21 denotes an optical fiber amplifier; 22 an optical filter; 23 a light reception unit (O/E); 24 a monitor unit; 25 a delay circuit; 26 an optical amplifier control circuit; 27 an optical filter control circuit; 28, 30 and 31 optical branching units; 29 an optical wavelength multiplexer; 32 to 34 photoconverters (PD); and 35 a semiconductor laser (LD).

In FIG. 7, the photoconverter (PD) 32 and the monitor unit 24 correspond to the monitor unit 14 and the optical surge detecting circuit 18 of FIG. 6. Further, the optical fiber amplifier 21, the optical wavelength multiplexer 29, the optical branching unit 30, the photoconverter (PD) 33, the semiconductor laser (LD) 35 and the optical amplifier control circuit 26 correspond to the optical amplifier 11 and the optical amplifier control circuit 16 of FIG. 6. Still further, the above units 21, 29, 30, 33, 35 and 26 also correspond to the optical amplifier 1 of FIG. 5.

Still further, the optical filter 22, the optical branching unit 31, the photoconverter (PD) 34 and the optical filter control circuit 27 correspond to the optical filter 12 and the optical filter control circuit 17 of FIG. 2, and also correspond to the optical filter 2. Still further, the delay circuit 25 corresponds to the delay circuit 15 of FIG. 6, and also corresponds to the delay/wavelength converter 5 of FIG. 5.

The tunable optical filter is formed by the optical filter 22, the optical branching unit 31, the photoconverter 34 and the optical filter control circuit 27 in FIG. 7. In this embodiment, the optical filter control circuit 27 can be controlled by the monitor unit 24. As examples of the tunable optical filter, there are an acoustoptic filter, a Fabry-Perot filter, and a filter using a LiNbO₃ substrate.

The power of the pumping light generated by the semiconductor laser 35 is controlled by the optical amplifier control circuit 26 as the output level of the light signal amplified by the optical fiber amplifier being set to the predetermined level.

The monitor unit 24 includes the structure for detecting the cut-off of the light signal and the light surge. When the monitor unit 24 detects the cut-off of the light signal, the monitor unit 24 controls the optical filter control circuit 27 in such a way that the band of the transmission wavelength of the optical filter 22 becomes out of the wavelength of the light signal.

When the light signal is input again, the monitor unit 24 controls the optical filter control circuit 27 so as to start the normal tracking operation after the predetermined protection time until the operation of the optical fiber amplifier 21 becomes normal. As a result, even if the light surge is induced from the optical fiber amplifier 21 after the light signal was cut off, the light surge can be eliminated by the optical filter 22.

When the light surge is input from the optical amplifier of the previous stage, and when the monitor unit 24 detects the light surge as well as the fluctuation component of the light signal (the fluctuation component is faster than the response time at the optical fiber amplifier 21), the monitor unit 24 controls the optical filter control circuit 27 in such a way that the band of the transmission wavelength of the optical filter 22 becomes out of the wavelength of the light signal. The delay circuit 25 delays the light surge from the optical fiber amplifier 21 for the time corresponding to the delay time of the optical filter 22.

In this case, although the optical amplifier control circuit 26 controls the output level of the light signal from the optical fiber amplifier 21 so as to become the predetermined level when the light surge is input, the light surge is not sufficiently eliminated due to the delay in control at the circuit itself (i.e., delay in response time of the circuit).

However, as explained above, since the band of the transmission wavelength of the optical filter 22 is controlled, the light surge from the optical fiber amplifier 21 can be eliminated. Further, when there is no light surge, the monitor unit 24 controls the optical filter control circuit 27 so as to return the band of the transmission wavelength of the optical filter 22 so that the optical filter control circuit 27 performs the normal tracking operation. Accordingly, even if the light surge is output from the optical fiber amplifier 21, it can be eliminated by the optical filter 22 so that it is possible to protect the following circuits.

Further, the optical amplifier control circuit 36 includes only the structure which controls the output level of the light signal of the optical fiber amplifier 21 to the predetermined level so that it is possible to control only the band of the transmission wavelength of the optical filter 22 in accordance with the cut-off of the light signal or the light surge. In this case, although there is a large possibility that the light surge is induced from the optical fiber amplifier 21 at the moment when the light signal is cut off, it is possible to eliminate such light surge by using the optical filter 22.

Still further, it is possible to provide the structure which the light signal is directly transmitted from the optical filter 22 to the following circuit through the optical branching unit 31 and the optical fiber. In this case, it is not necessary to provide the light reception unit 23. According to this structure, it is possible to utilize the light reception apparatus as an optical repeater in the long distance optical transmission system.

Figure 8:
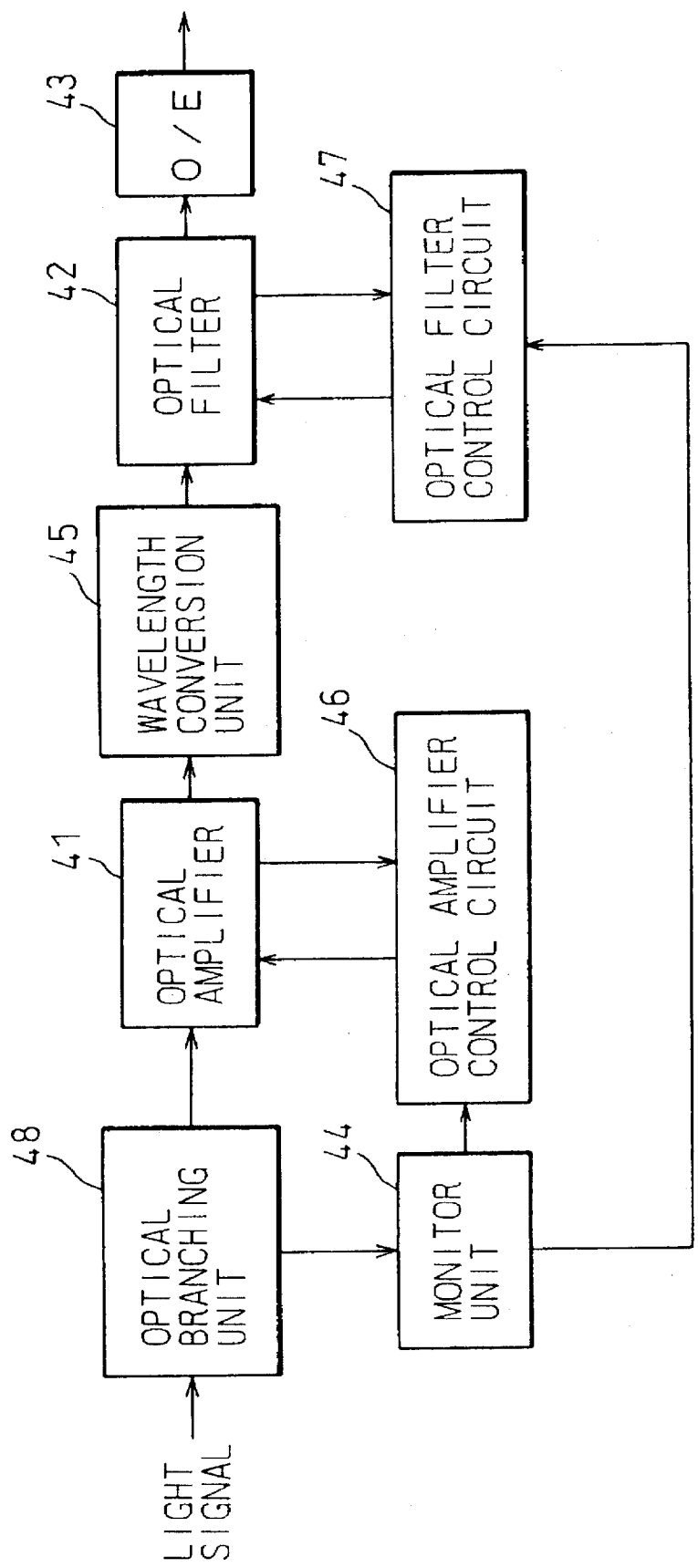
FIG. 8 is a block diagram of a light signal reception apparatus according to a second embodiment of the present invention.

FIG. 8 is a block diagram of a light signal reception apparatus according to a second embodiment of the present invention. In FIG. 8, reference number 41 denotes an optical amplifier, 42 an optical filter, 43 a light reception unit (O/E), 44 a monitor unit, 45 a wavelength conversion element, 46 an optical amplifier control circuit, 47 an optical filter control circuit, and 48 an optical branching unit.

In this embodiment, the optical amplifier 41 controlled by the optical amplifier control circuit 46, and the optical filter 42 controlled by the optical filter control circuit 47, can be formed by the same structure as the first embodiment. The feature of the second embodiment lies in the wavelength conversion element 45 which is provided between the optical amplifier 41 and the optical filter 42.

The wavelength conversion element 45 utilizes a self-phase modulation (SPM) effect caused by a known optical Kerr effect. That is, according to the SPM effect, when the light signal amplified by the optical amplifier 41 is input to the wavelength conversion element 45 in the normal state, the wavelength thereof is not shifted. However, when the large light surge having large power is input thereto, a leading portion of the light surge is shifted to a side of shorter wavelength, and a trailing portion thereof is shifted to a side of longer wavelength.

Accordingly, when a bandwidth of the transmission wavelength of the optical filter 42 and a coefficient of an optical Kerr effect (or, the SPM effect) of the wavelength conversion element 45 are selected, the wavelength of the light surge is shifted by the wavelength conversion element 45 when the light surge is induced from the optical amplifier 41. As a result, since the wavelength is shifted out of the band of the transmission wavelength of the optical filter 42, it is possible to eliminate the output of the light surge.

Regarding a shift of an optical angle frequency caused by the SPM effect, in the document G. P. Agrawal, "Nonlinear Fiber Optics" pp. 75 to 78, formula (4.1.7), the following formula is disclosed.

$$\delta\omega = -\partial\phi_{NL}/\partial T \quad (1)$$

$$= (-\partial|U(0,T)|^2/\partial T) \cdot (Z_{eff}/L_{NL})$$

Where, "T" is a time defined by the formula "T=t−z/vg", and measured in a frame of a reference moving coordinate "z" with a pulse at the group velocity "vg"; "$\phi_{NL}$" is a non-linear phase-shift induced by the SPM effect; "U(0,T)" is an amplitude of the pulse-envelope normalized by the pulse peak power; and "$L_{NL}$" is a non-linear length.

$$\gamma = n_2\omega_0/C \cdot A_{ef} = n_2 2\pi/\lambda \cdot A_{ef} \quad (2)$$

$$Z_{eff} = (1/\alpha)[1-\exp(-\alpha L)] \quad (3)$$

$$L_{NL} = (\gamma P_0)^{-1} \quad (4)$$

Where, "L" is a length of a wavelength conversion element (i.e., a length of a device inducing the SPM effect); "$\gamma$" is a non-linear constant of the wavelength conversion element; "$\alpha$" is a loss coefficient of the wavelength conversion element; "$P_0$" is peak power of the optical pulse; and "$n_2$" is a secondary non-linear refractive index of the wavelength conversion element (i.e., when a light power is large, a refractive index of a material depends on the light power and given by the formula "$n=n_0+n_2 P$". The SPM depends on the light power.).

Further, "$\omega_0$" is an optical angle frequency; "C" is a velocity of light; "$\lambda$" is a light wavelength (1.55 μm, in normal); and "Aef" is an effective cross-sectional area of the wavelength conversion element (i.e., this area is obtained by weighting the cross-sectional area, in which the light can be induced, in accordance with a distribution of the intensity of the light).

When substituting formulas (2) to (4) for the formula (1), the following formula is obtained.

$$\delta\omega(T) = [-\partial|U(0,T)|^2/\partial T]\gamma P_0[1-\exp(-\alpha L)/\alpha] \quad (5)$$

When $P_0|U(0,T)|^2=P(T)$, the following formula is obtained. Where, "P(T)" means an optical wavelength form.

$$\delta\omega(T) = -[\partial P(T)/\partial T]\gamma[1-\exp(-\alpha L)/\alpha] \quad (6)$$

This formula (6) indicates that the change of the optical angle frequency based on the SPM can be obtained by the change of the optical pulse waveform with the time.

Further, when substituting the formula $\omega_0/C=2\pi/\lambda$ (this is derived from "$\omega_0=2\pi C/\lambda$") for the formula (6), the following formula is obtained.

$$\delta\omega(T) = -(2\pi c/\lambda^2)\delta\lambda(t) \quad (7)$$

When expressing the above formula as change of the light wavelength, the following formula is obtained.

$$\delta\lambda(T) = (\lambda n_2 \cdot c \cdot A_{ef})[\partial P(T)/\partial T][1-\exp(-\alpha L)/\alpha] \quad (8)$$

When substituting the following various numerals for the formula (8), the formula (8) is given as follows.

$\lambda$=1.55 (μm),
$n_2$=3.2×10$^{-20}$ (m$^2$/W),
c=3×10$^8$ (m/s),
Aef=5×10$^{-11}$ (m$^2$),
ΔP=1 (W; watt),
ΔT=100×10$^{-12}$ (s; second),
L=10$^4$ (m; meter), and
α=0.2 (dB/Km)=0.046/km=4.6×10$^{-5}$/m When the change of the wavelength is converted to the change of the frequency in the wavelength λ=1.55 (μm), the following formulas are obtained from the formula (7).

$\delta\omega(T)=-(2\pi c/\lambda^2)\delta\lambda(T)$ (change of optical angle frequency)

$\delta v(T)=(C/\lambda^{-2})\delta\lambda(T)$ (change of optical frequency)

When the change of the wavelength of 0.26 nm, the following value is obtained.

=−[3×10$^8$/(1.55×10$^{-6}$)$^2$]×(0.26×10$^{-9}$)
=3.25×10$^{10}$ (Hz)
=32.5 (GHz)

In this case, it is possible to obtain a large non-linear constant "γ" by using a known chalcogenide glass (this glass is made by a chemical compound with a chalcogon element, and has a large nonlinear coefficient). This is explained in detail in the following document, M. Asobe, T. Kanamori, K. Kubodera, "IEEE PHOTONICS TECHNOLOGY DETTERS", Vol. 4, No. 4, April 1992, pp. 362 to 365.

For example, when $n_2=4.2\times10^{-18}$ m$^2$/W, the formula (8) is given below.

$\delta\lambda(T)$=34.1 [nm]

In general, since the bandwidth of the optical filter used for the reception unit is given by 0.5 to 3 nm, the value 34.1 nm is sufficient as the shift value of the light wavelength.

As explained above, the wavelength of the light surge is shifted by the wavelength conversion element 45 so that the light surge is shifted out of the band of the transmission wavelength of the optical filter 42. As a result, it is possible to eliminate the light surge. Accordingly, it is possible to fix the band of the transmission wavelength of the optical filter 42. However, in the present invention, the band of the transmission wavelength of the optical filter 42 is set to a narrow range so that only the light signal can be transmitted therethrough. Further, the band of the transmission wavelength is controlled by the optical filter control circuit 47 so as to follow fluctuation of the wavelength of the light signal.

When the monitor 44 detects the cut-off of the light signal, it controls the band of the transmission wavelength of the optical filter 42 so as to be out of the wavelength of light signal. When the light signal is input, the monitor starts the tracking control so as to follow the wavelength of the light signal of the optical filter 42 after the predetermined protection time.

Figure 9:
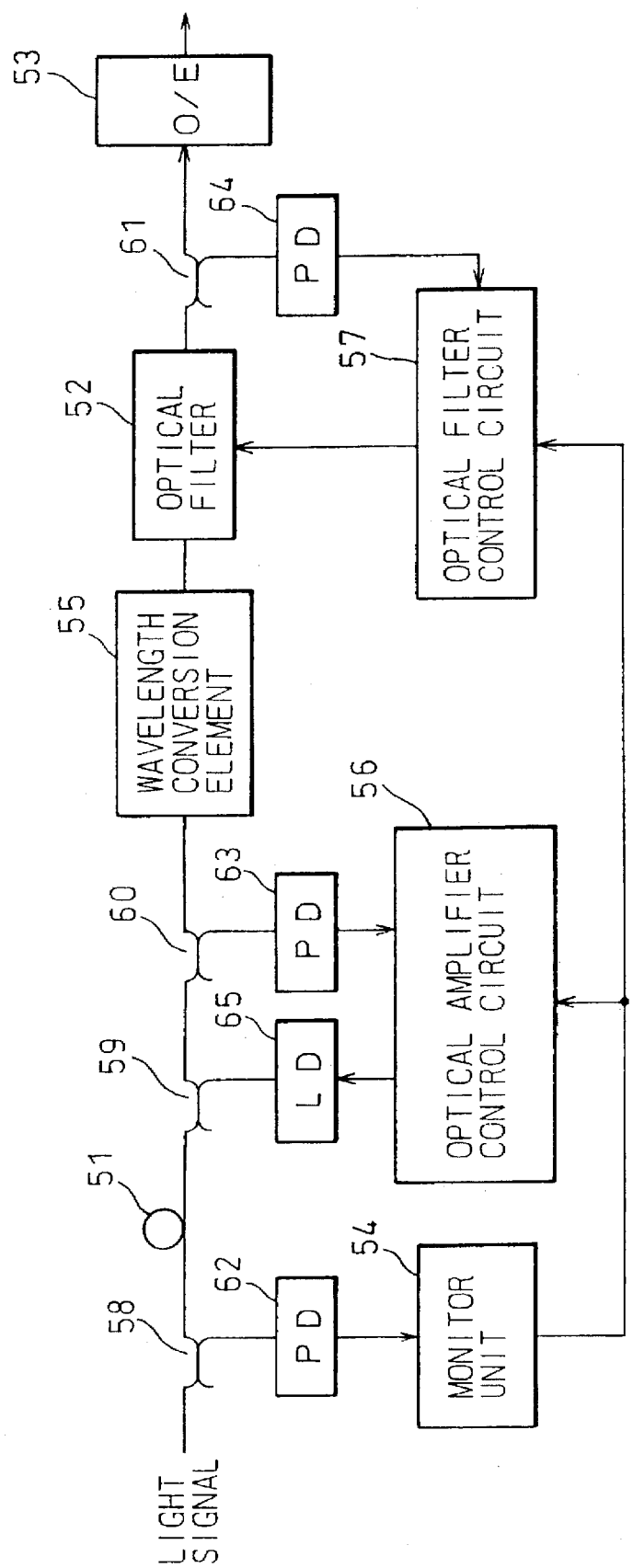
FIG. 9 is an explanatory view of the second embodiment shown in FIG. 8.

FIG. 9 is an explanatory view of the second embodiment of the present invention. In FIG. 9, reference number 51 denotes an optical fiber amplifier; 52 an optical filter; 53 a light reception unit (O/E); 54 a monitor unit; 55 a wavelength conversion element; 56 an optical amplifier control circuit; 57 an optical filter control circuit; 58, 60, 61 optical branching units; 59 an optical wavelength multiplexer; 62 to 64 photoconverters (PD); and 65 a semiconductor laser (LD).

In this drawing, the photoconverter (PD) 62 and the monitor unit 54 correspond to the monitor unit 44 of FIG. 8. Further, the optical fiber amplifier 51, the optical wavelength multiplexer 59, the optical branching unit 60, the photoconverter (PD) 63, the semiconductor laser (LD) 65, and the optical amplifier control circuit 56 correspond to the optical amplifier 41 and the optical amplifier control circuit 46 of FIG. 8, and also correspond to the optical amplifier 1 of FIG. 5. The optical filter 52, the optical branching unit 61, the photoconverter (PD) 64, and the optical filter control circuit 57 corresponds to the optical filter 42 and the optical filter control circuit 47, and also corresponds to the optical filter 2 of FIG. 5. The wavelength conversion unit 55 corresponds to the wavelength conversion unit 45 of FIG. 8, and also corresponds to the delay/wavelength conversion unit 5 of FIG. 5.

A material having large optical Kerr effect is preferably selected as the wavelength conversion element 55. For example, an optical fiber having a small diameter of a mode field, an oxide fiber, etc., can be used as the wavelength conversion element 55. Further, it is possible to utilize a semiconductor amplifier having a structure of a multiple quantum well (MQW). Still further, if a delay characteristic is given to the wavelength conversion element 55 itself, it is possible to use this element as a delay circuit instead of the delay circuits 15 and 22 of FIGS. 6 and 7.

Although the light signal is converted to the electrical signal in the light reception unit 53 and transmitted to the following circuit, it is possible to omit the light reception unit 53 by using the optical fiber at the output side of the optical branching unit 61.

Figure 10:
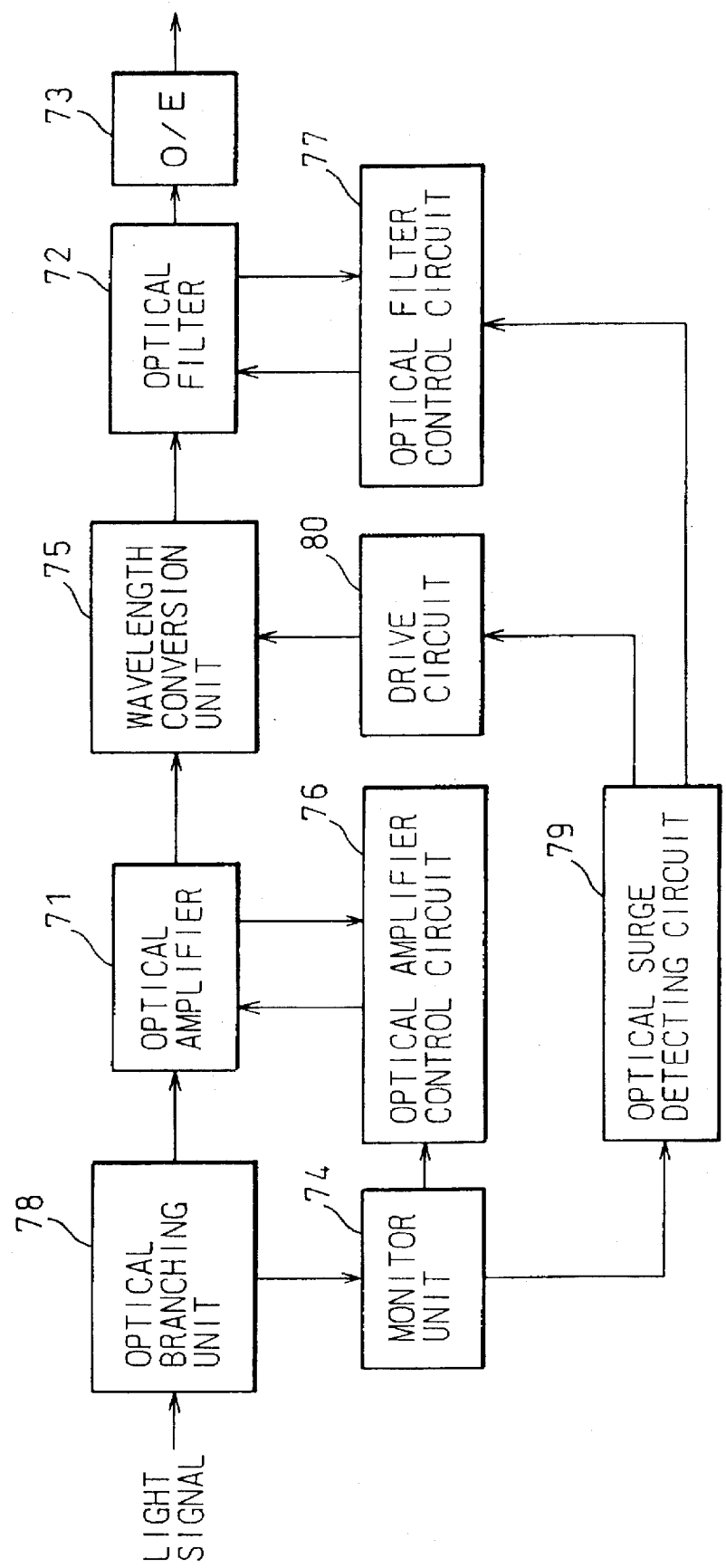
FIG. 10 is a block diagram of a light signal reception apparatus according to a third embodiment of the present invention.

FIG. 10 is a block diagram of a light signal reception apparatus according to a third embodiment of the present invention. In FIG. 6, reference number 71 denotes an optical amplifier, 72 an optical filter, 73 a light reception unit (O/E), 74 a monitor unit, 75 a wavelength conversion unit, 76 an optical amplifier control circuit, 77 an optical filter control circuit, 78 an optical branching unit, 79 an optical surge detecting circuit, and 80 a drive circuit.

In this embodiment, the optical amplifier 71 controlled by the optical amplifier control circuit 76 and the optical filter 72 controlled by the optical filter control circuit 77 have the same structure as the first and second embodiments. Further, the wavelength conversion unit 75 is provided between the optical amplifier 71 and the optical filter 72. The wavelength conversion unit 75 is formed by, for example, a bistable laser having a plurality of electrodes, a wavelength conversion laser, a four-wave mixing element, etc.. The drive circuit 80 includes a structure corresponding to the wavelength conversion unit 75. When the four-wave mixing element is used, the semiconductor laser is included. The light generated by the semiconductor laser is mixed with the output light signal from the optical amplifier 71 so that it is possible to shift the wavelength of the light signal.

In the normal state, the output level of the light signal of the optical amplifier 71 is controlled by the optical amplifier control circuit 76 so as to become a predetermined level. In this case, the light signal is passed through the wavelength conversion unit 75 and input to the optical filter 72. The band of the transmission wavelength of the optical filter 72 is controlled by the optical filter control circuit 77 in such a way that the output level of the light signal becomes maximum.

When the optical surge detecting circuit 79 detects the light surge through the monitor unit 74, it controls the wavelength conversion unit 75 through the drive circuit 80 in order to shift the wavelength of the light signal of the optical amplifier 71 so as to be out of transmission wavelength of the optical filter 72. As a result, even if the light surge is passed through the optical amplifier 71, it is possible to eliminate the light surge in the optical filter 72. In this case, the band of the transmission wavelength of the optical filter 72 can be controlled by the optical filter control circuit 77.

Further, it is possible to omit the light reception unit 73 by directly sending the light signal from the optical filter through the optical fiber so that it is possible to utilize the light reception apparatus for the long distance optical transmission system.

Figure 11:
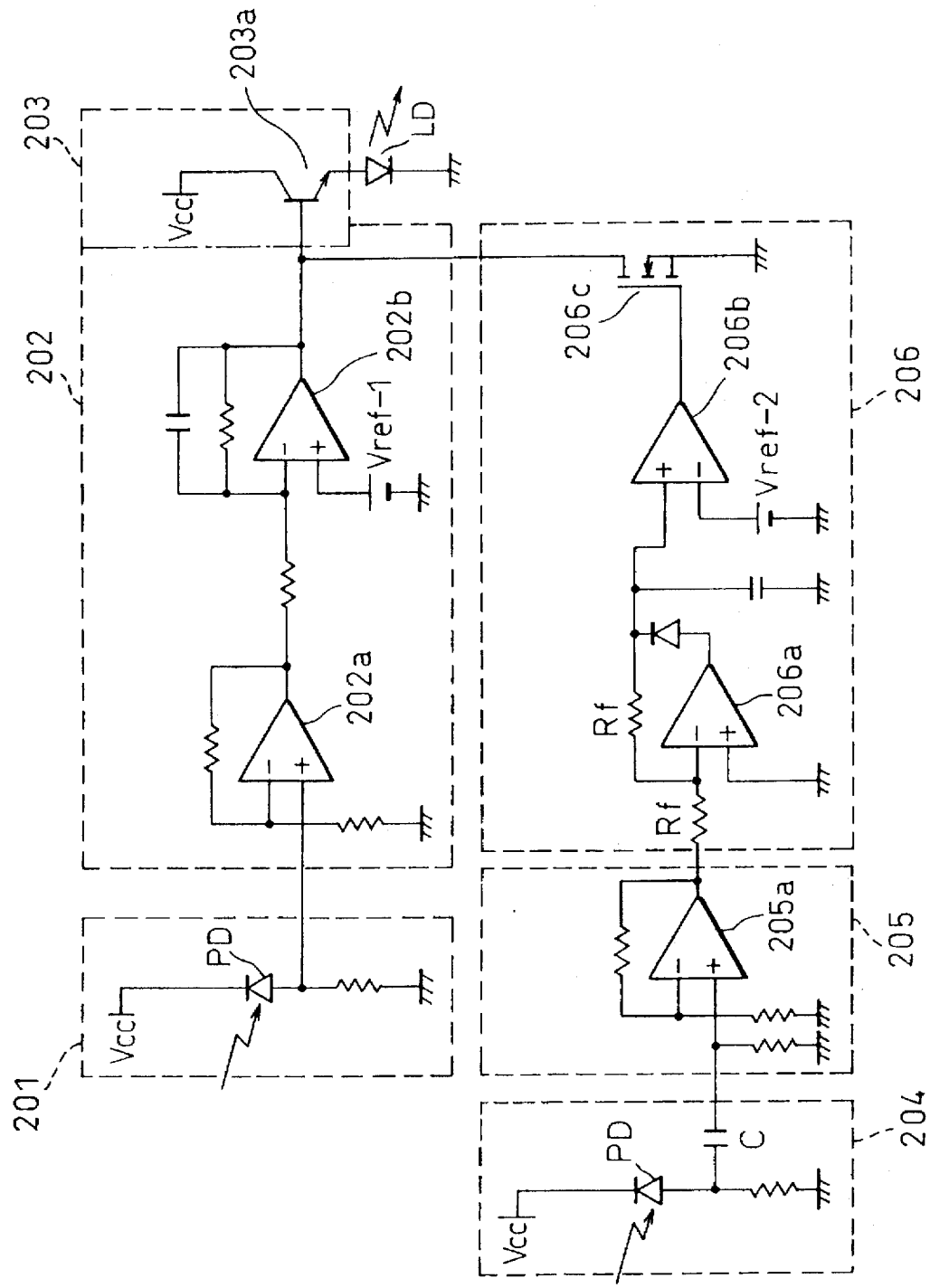
FIG. 11 is a detailed block diagram of one example of an optical amplifier control circuit used in the present invention.

FIG. 11 is a detailed block diagram of one example of the optical amplifier control circuit used in the present invention. The optical amplifier control circuit is formed by an optical output control circuit 201 to 203 and an optical shutdown circuit 204 to 206. The optical signal is received by the photodiode PD in a reception unit 201, and an electrical signal converted by the photodiode PD is amplified by an amplifier 202a. The voltage of an amplified signal is compared with a first reference voltage Vref-2 by a comparator 202b in order to control the amplified signal. An output of the comparator 202b is sent to a base of a transistor 203a. Accordingly, the current flowing in the transistor 203a is controlled so that an optical output of the semiconductor laser LD can be controlled.

When the voltage of the electrical signal (monitor voltage) at the photodiode PD is decreased, the optical output of the semiconductor LD is increased by controlling the pumping power so as to be increased. When the monitor voltage is increased, the optical output is decreased by controlling the pumping power so as to be decreased.

In the optical shutdown circuit, the fluctuation component (for example, a leading edge, trailing edge, etc.) of the electrical signal at the photodiode PD in a reception unit 204 is sent to an amplifier 205a through a condenser C and amplified thereby. The amplified signal is sent to a peak-hold circuit 206a. The peak-hold circuit 206a outputs a peakhold signal having a predetermined level in response to spike components (i.e., large fluctuation) of the amplified signal. The output of the peak-hold circuit 206a is sent to a comparator 206b and compared with a second reference voltage Vref-2. The output of the comparator 206b is sent to a base of a MOS-FET 206c so that the MOS-FET 206c is turned on.

When the MOS-FET 206c is turned on, the output of the comparator 202b is grounded so that a transistor 203a is turned off. As a result, the optical output from the semiconductor laser LD is stopped (i.e., the output is shut down). That is, when the light signal is cut off, the optical shutdown circuit operates so that the operation of the amplifier 202a and comparator 202b is stopped.

Figure 12:
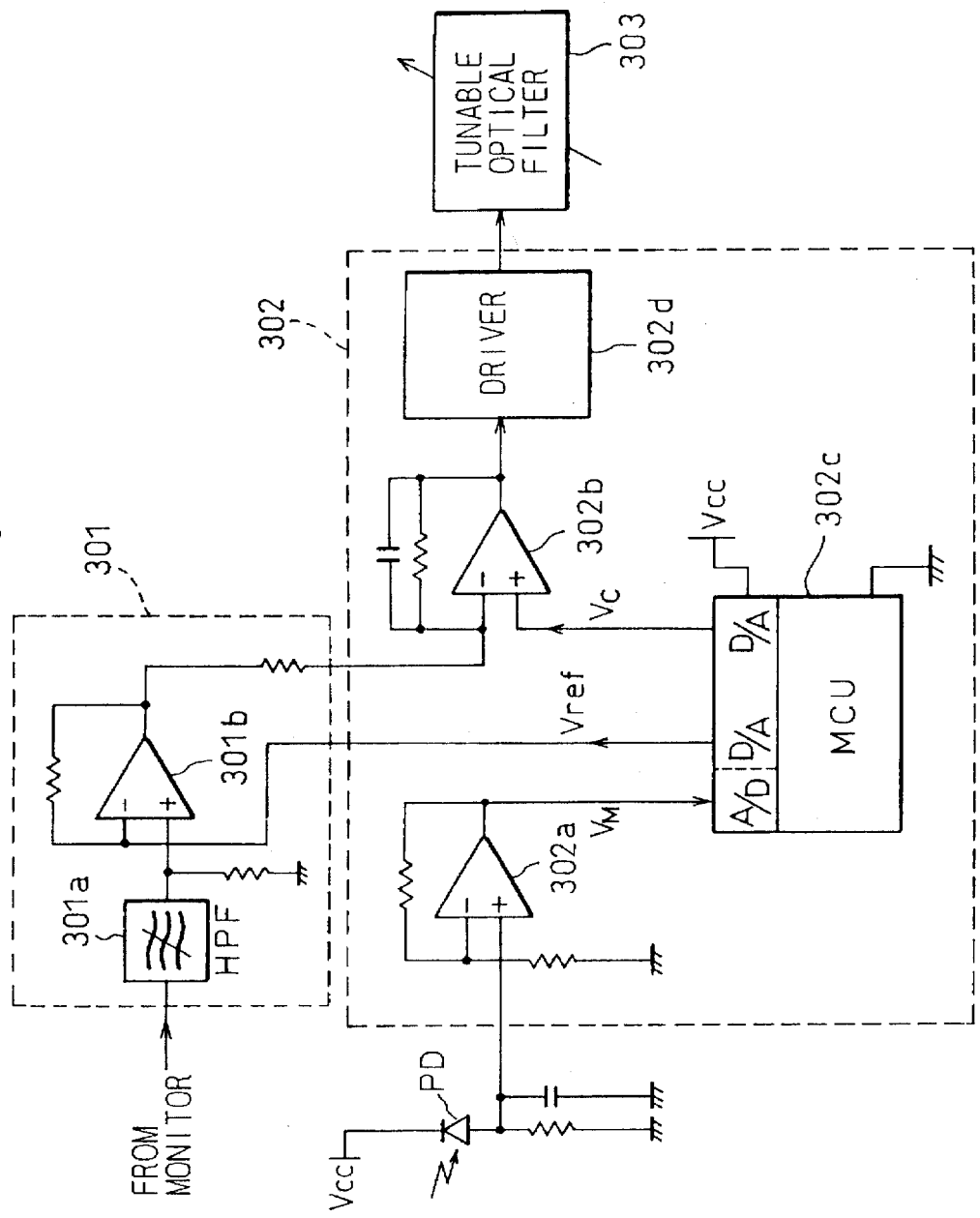
FIG. 12 is a detailed block diagram of one example of an optical surge detecting circuit and optical filter control circuit used in the present invention.

FIG. 12 is a detailed block diagram of one example of the optical surge detecting circuit and the optical filter control circuit used in the present invention. In the drawing, reference number 301 denotes an optical surge detecting circuit, and reference number 302 denotes an optical filter control circuit.

In the optical surge detecting circuit 301, an output signal of the monitor unit is sent to a high-pass filter (HPF) 301a, and the high-pass filter 301a transmits frequency components which are higher than the band of the control circuit of the optical amplifier. The signal passed through the high-pass filter 301a is amplified by an amplifier 301b. The output of the optical surge detecting circuit 301 is sent to a comparator 302b. In the comparator 302b, the output of the optical surge detecting circuit 301 is compared with a control voltage Vc which is applied by the microprocessor (MCU) 302c.

The output of the comparator 302b is sent to the tunable optical filter 303 through a drive circuit 302d. When the light surge is sent to the tunable optical filter 303, the band of the transmission wavelength of the optical filter is shifted so that the light surge can be eliminated. Further, when the light surge is not sent to the comparator 302b, the reference voltage Vref is applied from the microprocessor 302c to the amplifier 301a so that the amplifier 301b can generate the reference voltage Vref to the comparator 302b, as explained below.

In the optical filter control circuit 302, a part of the light which is transmitted through the tunable optical filter 303, is detected by the photodiode PD, and amplified by the amplifier 302a. An amplified signal VM is sent to the microprocessor 302c. An output signal VM is converted from an analog signal to a digital signal in an A/D converter provided in the microprocessor 302c. When the output signal VM is smaller than a threshold value, the control voltage Vc is generated and swept by the microprocessor 302c.

In this case, the control voltage Vc and the reference voltage Vref are sent to the comparator 302b. When the control voltage Vc is swept by the microprocessor 302c, the output of the comparator 302b is changed and transferred to the tunable optical filter 303 through the drive circuit 302d. Accordingly, in the tunable optical filter 303, the voltage applied thereto is changed in accordance with the change of the control voltage Vc so that the transmission wavelength is swept.

When the wavelength of the light signal coincides with the band of the wavelength of the optical filter 303, the light signal is detected by the photodiode PD. The value of the control voltage Vc at the time when the output signal VM becomes maximum (Vref-m), is stored in a memory (this is not shown, but, in general, this memory is provided in the microprocessor). The reference voltage Vref-m is fixed to that value. As mentioned above, the reference voltage Vref is sent from the microprocessor 302c to the comparator 302b through the amplifier 301b.

As is obvious from above explanations, the microprocessor 302c includes the basic steps of monitoring the output signal VM during sweep operation of the reference Vref, of storing the reference voltage Vref-m at the moment when the output voltage VM becomes maximum, and of outputting the reference voltage Vref-m.

I claim:

1. A light signal reception apparatus having a light surge eliminating function and provided in an optical transmission system, the apparatus comprising:
   optical amplifying means for receiving a light signal and amplifying said light signal to a predetermined level to maintain an amplified light signal at a setting level;
   optical filtering means operatively connected to the optical amplifying means fore eliminating a light surge and passing through the light signal;
   opto-electrical converting means operatively connected to the optical filtering means for converting the light signal to an electrical signal; and
   monitoring means operatively connected to the optical amplifying means for monitoring a fluctuation of the light signal, and controlling a transmission wavelength characteristic of the optical filtering means or a wavelength of the light signal in order to eliminate the light surge.

2. A light signal reception apparatus having a light surge eliminating function and provided in an optical transmission system, the apparatus comprising:
   optical amplifying means for receiving a light signal and amplifying said light signal to a predetermined level;
   optical filtering means operatively connected to the optical amplifying means fore eliminating the light surge and passing through the light signal;
   opto-electrical converting means operatively connected to the optical filtering means for converting the light Signal to an electrical signal; and
   monitoring means operatively connected to the optical amplifying means for monitoring a fluctuation of the light signal, and controlling a transmission wavelength characteristic of the optical filtering means or a wavelength of the light signal in order to eliminate the light surge,
   wherein the optical filtering means comprises a tunable optical filter of which the transmission wavelength is controlled in accordance with fluctuation of the wavelength of the light signal; and
   the monitoring means controls the tunable optical filter in such a way that the transmission wavelength of the tunable optical filter is shifted to be out of a band of the wavelength of the light signal at the moment when the monitoring means detects a cut-off of the light signal, and after a predetermined protection time from cut-off of the light signal, the transmission wavelength of the tunable optical filter is returned to control in accordance with fluctuation of the wavelength of the light signal.

3. A light signal reception apparatus having a light surge eliminating function and provided in an optical transmission system, the apparatus comprising:
   optical amplifying means for receiving a light signal and amplifying said light signal to a predetermined level;
   optical filtering means operatively connected to the optical amplifying means fore eliminating the light surge and passing through the light signal;
   opto-electrical converting means operatively connected to the optical filtering means for converting the light signal to an electrical signal; and
   monitoring means operatively connected to the optical amplifying means for monitoring a fluctuation of the light signal, and controlling a transmission wavelength characteristic of the optical filtering means or a wavelength of the light signal in order to eliminate the light surge,
   wherein the optical filtering means comprises a tunable optical filter of which the transmission wavelength is controlled in accordance with fluctuation of the wavelength of the light signal; and
   the monitoring means controls the tunable optical filter in such a way that the transmission wavelength of the tunable optical filter is shifted to be out of a band of the wavelength of the light signal at the moment when the monitoring means detects a fluctuation of the light signal which is faster than a response speed of the optical amplifying means.

4. A light signal reception apparatus as claimed in claim 1, wherein the optical filtering means comprises a tunable optical filter of which the transmission wavelength characteristic is controlled by monitoring an output level of the optical filtering means in such a way that the output level does not exceed a predetermined level.

5. A light signal reception apparatus having a light surge eliminating function and provided in an optical transmission system, the apparatus comprising:
   optical amplifying means for receiving a light signal and amplifying said light signal to a predetermined level;
   optical filtering means operatively connected to the optical amplifying means fore eliminating the light surge and passing through the light signal;
   opto-electrical converting means operatively connected to the optical filtering means for converting the light signal to an electrical signal; and
   monitoring means operatively connected to the optical amplifying means for monitoring a fluctuation of the light signal, and controlling a transmission wavelength characteristic of the optical filtering means or a wavelength of the light signal in order to eliminate the light surge;

a wavelength conversion element which is provided between the optical amplifying means and the optical filtering means, and the wavelength conversion element having a self-phase modulation function which changes the wavelength of the light signal to be out of the transmission wavelength of the optical filtering means when detecting a surge waveform of the light signal.

6. A light signal reception apparatus having a light surge eliminating function and provided in an optical transmission system, the apparatus comprising:

optical amplifying means for receiving a light signal and amplifying said light signal to a predetermined level;

optical filtering means operatively connected to the optical amplifying means fore eliminating the light surge and passing through the light signal;

opto-electrical converting means operatively connected to the optical filtering means for converting the light signal to an electrical signal; and monitoring means operatively connected to the optical amplifying means for monitoring a fluctuation of the light signal, and controlling a transmission wavelength characteristic of the optical filtering means or a wavelength of the light signal in order to eliminate the light surge;

a wavelength conversion unit which is provided between the optical amplifying means and the optical filtering means, and the wavelength conversion unit performing change of the wavelength of the light signal to be out of the transmission wavelength of the optical filtering means at the moment when the monitor means detects a surge waveform of the light signal.

7. A light signal reception apparatus as claimed in claim 5, wherein the wavelength conversion element or unit comprises delay means for delaying the light surge.

8. A light signal reception apparatus as claimed in claim 5, wherein the wavelength conversion element comprises a chalcogenide glass.

9. A light signal reception apparatus as claimed in claim 6, wherein the wavelength conversion unit comprises a bistable laser element, a wavelength conversion laser element, or a four-wave mixing element.

10. A light signal reception apparatus as claimed in claim 6, wherein the wavelength conversion element or unit comprises delay means for delaying the light surge.

* * * * *